P. POULAIN.
DIAMOND POINT CUTTING TOOL.
APPLICATION FILED JUNE 2, 1920.

1,346,056.

Patented July 6, 1920.

INVENTOR
PAUL POULAIN
BY Horne and Horne
ATTORNEYS

UNITED STATES PATENT OFFICE.

PAUL POULAIN, OF PARIS, FRANCE.

DIAMOND-POINT CUTTING-TOOL.

1,346,056.  Specification of Letters Patent.  Patented July 6, 1920.

Application filed June 2, 1920. Serial No. 386,086.

*To all whom it may concern:*

Be it known that I, PAUL POULAIN, a citizen of the Republic of France, and a resident of 96 Rue Saint Maur, Paris, France, have invented new and useful Improvements in Diamond-Point Cutting-Tools, of which the following is a specification.

This invention relates to diamond-point tools for cutting or working all materials, such as steel, bronze, fiber, ebonite, paper, rubber and other materials, and has for object to provide a tool of high resistance and easily adjusted so as to reduce the risks of injuring the diamond.

The improvement, according to the present invention, consists in mounting the diamond, which is cut in a special manner, in a cavity formed between two jaws arranged at the end of a rigid support and adapted to be brought together by suitable locking or clamping means.

The accompanying drawing represents by way of example one form of construction of the invention:

Figure 1:
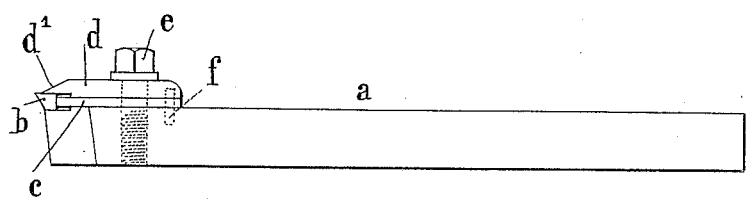
Figure 1 is an elevation of the tool.
Figure 2:
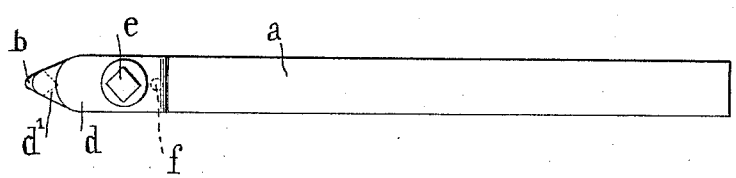
Fig. 2 is a corresponding plan view.

A support or shank $a$ of suitable metal, for example, hardened steel, has its extremity formed to bevel shape, to receive the diamond $b$ which is cut to a special shape, its rear end being engaged in a notch of suitable profile in a plate $c$ which acts as an abutment. Above this plate $c$ is arranged another plate $d$, of greater length than the plate $c$, and also cut on the bevel at its front end to form a jaw which bears at its point upon the diamond $b$. A square-headed bolt or screw $e$ allows the plates $c$ and $d$ to be tightened upon the body or shank $a$ of the tool, so as to hold the diamond firmly without movement; a steady-pin $f$ integral with the plate $d$ insures the correct location of the said plate $d$ and of the plate $c$ in relation to the body $a$ of the tool. The plate or jaw $d$ has an inclined upper face $d^1$ to allow the free escape of cuttings or turnings.

This arrangement permits the diamond to be mounted with the desired cutting angle and with suitable rake, and the tool to be given the relief required; the tool can, therefore, be made to work in a normal manner, with little fatigue and also minimum danger of breakage of the diamond point.

The setting upon the lathe or other machine can be considerably simplified, because the point can be cut with such elements or faces that the shank of the tool may be placed in either of two well-defined directions for example, in a lathe, either parallel or perpendicular to its longitudinal axis.

It will be understood that the invention is not limited to the details of construction which have been described; for example, the diamond-support could be formed in one piece by means of a rigid shank split or slotted for a portion of its length, the diamond being gripped between the two jaws thus provided, and the jaws brought together by means of a bolt passing through one of the jaws and screwing into the other.

Having now particularly described and ascertained the nature of my said invention and in what manner the same is to be performed, I declare that what I claim is:

1. A cutting tool comprising a shank, two jaws at the forward end of said shank, a diamond mounted between said jaws, a plate forming a rear abutment for said diamond, and means for clamping the jaws upon the diamond and the abutment plate.

2. A cutting tool comprising a rigid shank forming a lower jaw, one end being cut on the bevel, a diamond arranged to project in relation to the said end, a plate forming a rear abutment for the diamond, an upper jaw bearing upon the abutment plate and the diamond, and a securing bolt screwed into the body of the rigid shank.

3. A cutting tool comprising a rigid shank forming a lower jaw, of which one extremity is cut on the bevel, a diamond arranged to project from the said extremity, a plate forming a rear abutment for the diamond, an upper jaw provided with an inclined surface for the escape of cuttings and bearing upon the abutment plate and diamond, and a clamping bolt screwed into the body of the rigid shank.

In testimony whereof I have signed my name to this specification.

PAUL POULAIN.

Witnesses:
J. ARMENGAUD,
P. ARMENGAUD.